(12) United States Patent
Knowles

(10) Patent No.: US 6,370,497 B1
(45) Date of Patent: Apr. 9, 2002

(54) NATURAL LANGUAGE TRANSFORMATIONS FOR PROPAGATING HYPERTEXT LABEL CHANGES

(75) Inventor: Nicholas Knowles, Longon (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/250,647

(22) Filed: Feb. 16, 1999

(30) Foreign Application Priority Data

Jun. 29, 1998 (CA) .............................................. 2241836

(51) Int. Cl.<sup>7</sup> .......................... G06F 17/20; G06F 17/21
(52) U.S. Cl. .......................................... 704/1; 707/501
(58) Field of Search ..................... 704/1, 8–9; 707/530, 707/531, 513, 500, 501; 345/352, 326

(56) References Cited

U.S. PATENT DOCUMENTS

| 5,848,407 A | * | 12/1998 | Ishikawa et al. ................ 707/2 |
| 5,848,427 A | * | 12/1998 | Hyoda ......................... 707/513 |
| 5,946,697 A | * | 8/1999 | Shen ........................... 707/104 |
| 6,003,046 A | * | 12/1999 | Nielsen ....................... 707/513 |
| 6,018,748 A | * | 1/2000 | Smith .......................... 707/501 |
| 6,026,433 A | * | 2/2000 | D'Arlach et al. ............ 709/217 |
| 6,088,707 A | * | 7/2000 | Bates et al. .................. 707/501 |
| 6,122,647 A | * | 9/2000 | Horowitz et al. ........... 707/513 |

\* cited by examiner

*Primary Examiner*—Patrick N. Edouard
(74) *Attorney, Agent, or Firm*—A. Bruce Clay; Myers, Bigel, Sibley & Sajovec, P.A.

(57) ABSTRACT

In a page for computer display structured with labels for programmed navigational program links, such as a page programmed in HTML with hypertext link tags, a small amount of simple linguistic case information on contextual use of the label on the page presented can be stored as an extra property or attribute on the link itself. This programming data is then used during rendering of the link to resolve the text of the link label in its proper context on the page, even if a change has been propagated to the name of the link's destination.

27 Claims, 3 Drawing Sheets

NATURAL LANGUAGE TRANSFORMATIONS FOR PROPAGATING HYPERTEXT LABEL CHANGES

FIELD OF THE INVENTION

This invention is in the field of automatic translation of natural language text. It specifically provides a technique for propagating simple language changes in computer displayed text through navigational programming links.

BACKGROUND OF THE INVENTION

Programming links are navigational aids frequently used in online text that permit users to read and navigate text and graphics in a nonlinear fashion, based on what the user wants to see next. The link embeds the address of a destination object behind a textual label (a word or a phrase) that is generally set off, visually, from the remainder of the text through the use of highlighting, underlining or contrasting colour.

The address is a pointer to a destination that is quite often not sequentially in order with the page in which the label is located. In Internet use, such addresses may point to pages on servers in remote locations, under the control of different operators. The user merely selects the label (double-clicks the left mouse button), and the system's browser automatically locates the destination page or site, accesses the information from the destination, and renders the text and graphics from it onto the user's computer display.

A form of linkage that is now commonly used is based on the concept of "hypertext" and a transfer method known as HTTP (Hypertext Transfer Protocol). HTTP is designed to run primarily over TCP/IT (Transmission Control Protocol/Internet Protocol), a networking protocol that permits use of the Internet, but is also used for local network connections.

One format for information transfer is to create documents using Hypertext Markup Language (HTML), a programming language that supports navigational linking. HTML is a structured language, based on SGML (Standard Generalized Markup Language), a document processing system. Like SGML, HTML describes the structure of the document through a system of tags; HTML pages are made up of standard text as well as formatting codes for headings, paragraphs, lists, tables and character styles, that indicate how the page should be displayed. However, HTML defines a set of common document styles particularly for web pages, particularly because it includes a tag called a "link tag" that provides the programming for nonlinear navigational links.

U.S. Pat. No. 5,530,852 of Sun Microsystems, Inc., titled "Method for Extracting Profiles and Topics from a First File Written in a First Markup Language and Generating Files in Different Markup Languages Containing the Profiles and Topics for use in Accessing Data and Described by the profiles and Topics", describes a method for converting a file from SGML to HTML, including adding "anchors" or navigational links referencing other files during the conversion.

Although HTML and hypertext are commonly associated with World Wide Web (WWW) applications over the Internet, they are also widely used in online tools, such as program design tools, authoring tools and online help, to present information in an intuitive fashion. To get more information on a topic, the user can simply click on a label for the topic that links the user to a new screen, window or dialog box containing the new information. This destination screen can itself include links on words or phrases to permit the user to easily navigate to still other screens and topics, farther removed from the starting point.

As discussed in greater detail below, in a typical piece of hypertext, the data stored in the hypertext link is both an address pointing to a remote destination, and a textual label. This is programmed in HTML by embedding the address of the link destination in the link tag. In the case of local pages, the address is usually the pathname of the file containing the destination page, and may include the directory and subdirectory, as needed for local access. The WWW makes use of Uniform Resource Locator (URL) to define the address of a particular page on the Internet. Hypertext for an Internet link includes the URL of the remote destination. The URL naming system consists of tree parts: the transfer format (often "http") followed by a colon and two forward slashes (://), the name of the host machine that holds the file, and finally, the path to the file on the host machine. In HTML the <A>tag is used to specify a link and its label. For example "<a href="www.ibm.com">IBM</a>" would have a label of IBM and point to www.ibm.com.

When a client accesses a web page, it does so through a software program called a browser which establishes the connection with the server hosting the page. The server executes corresponding server software which presents information to the client in a transfer format (eg., http) response corresponding with the web page or other data generated by the server. Other data included in the http response can provide authorisation confirmation for the client's access to the page, as described in U.S. Pat. No. 5,708,780 of Open Market, Inc., titled "Internet Server Access Control and Monitoring System".

As the web page is initialized on the client machine, the browser renders the text and graphics for it from the HTML data. If the page includes link tags, the browser attempts to resolve these by requiring each link object to provide the default text for the link labels. If the user selects a link the address is resolved and the text from the target element is fetched.

A problem arises when the destination object changes its name. Often it is desirable that the labels of all references found in links for the destination must also be changed for consistency.

Normally, in an online tool, a change in the name of the destination object requires a programmer to locate all references/links to the destination object, and to change them individually to ensure that contextual consistency is maintained. In the case of a change on an Internet page, nothing can be done to propagate the change other than notifying operators of all known references to effect the change, and rely on them to do so. If the change includes a change in the URL, sites which do not effect the change or which are not notified will simply have a link which cannot be executed by the browser.

The following simple example will illustrate the problem. A hypertext page on the internal network of ABC Co. has a sentence with two links pointing to the home page of the company. The page could be rendered in text in the form "The ABC Co. provides services to the users of the ABC Co.'s services". This would be encoded in HTML using two hypertext links of the form:

"<a href-transfer format://www.abc.com>The ABC Co. </a> provides services to users of the <a href= the ABC Co.'s </a>services."

Note that the grammatical case of the second label is the possessive, indicated in English by an apostrophe.

If the ABC Co. is acquired by the XYZ Co. and renamed the XYZ Services Division, then every piece of hypertext referencing the ABC Company's home page (now the XYZ Services Division main web page) would have to be located and its label changed to the new name, the XYZ Services Division web page, furthermore this would have to be done in a way that kept the correct case agreement of the name endings as used in the possessive.

"The XYZ Services Division provides services to users of the XYZ Services Division's services".

On renaming a destination such as this, the preferred solution would be to be able to automatically rename all reference links to the destination.

One reason that this is difficult to do is that even if the label is a simple noun, it must be taken in context at the link location and, changes to the label must agree with the case of the rest of the sentence in which the label is presented.

An automatic change (such as a broadcast to the browser) that simply provides a global replacement for all references will result in "The ABC Co. provides services" being replaced with "The XYZ Services Division provides services" and "The ABC Co.'s services" being replaced with "The XYZ Services Division services". The replacement in the second phrase is clearly incorrect in the grammatical context of that phrase of text as it lacks the possessive 's'.

SUMMARY OF THE INVENTION

It is therefore an object of the present invention to provide a technique for automatically reflecting a change in the name of a destination, in the labels of all reference links to it, and to propagate the change throughout the links in such a way that the change in each label fronting a link is correctly made in the grammatical context of that label in the vast majority of cases.

One discovery of the invention has been that dealing with simple grammatical transforms, particularly in the English language, is relatively straightforward because of the lack of complex inflections and case endings required. As a result, a small amount of simple linguistic case information on contextual use of the label on the page presented can be stored as an extra property or attribute on the link itself. This programming data is then used during installation of the link by rendering the text of the link label in its proper context on the page, even if a change has been propagated to the name of the link's destination. This information is easy to store for a language, but can be applied most simply in English.

Accordingly, the present invention provides a system for rendering text for a page to be displayed by computer when the page contains a navigational reference to another computer-displayable page.

The system consists of a link attribute on the navigational reference identifying lexical characteristics of text for the navigational reference in context of the text for the page to be displayed, and a text-rendering program, such as a browser, adapted to calculate at least one likely form of the text for the navigational reference from the link attribute, while rendering the text for the page to be displayed.

In another aspect, the invention provides a system for rendering labels for navigational reference links to destination objects for display on a page of data on a computer in which programming data provides lexical properties associated with the labels in the context of the page of data. A browser program for rendering text and graphics for the page of data, includes (i) means to obtain name changes from the destination objects, and (ii) means to transform the name changes to contextual text using the programming data associated with the labels.

The invention further provides a method for transforming text associated with a reference link to a destination object, for rendering said text on a page displayed by a computer. The method includes steps implemented by a computer of obtaining a notification of a change in the reference link, then applying at least one transformation to the change and rendering text for the transformation.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

As discussed above, to create a link in an HTML page to another page, the HTML link tag is used. This consists of an opening tag <A . . . >, the text that would conventionally be used for the actual label (highlighted, underlined, coloured text) on the screen and a closing tag </A>.

Between the brackets (<>), the opening tag includes the name of the tag ("A") and attributes about the link. The attributes can typically contain options or other information about the tag itself. The most common attributes are name, HREF (Hypertext REFerence) attribute used to specify the name or URL of the file where the link points, and title.

Figure 1:
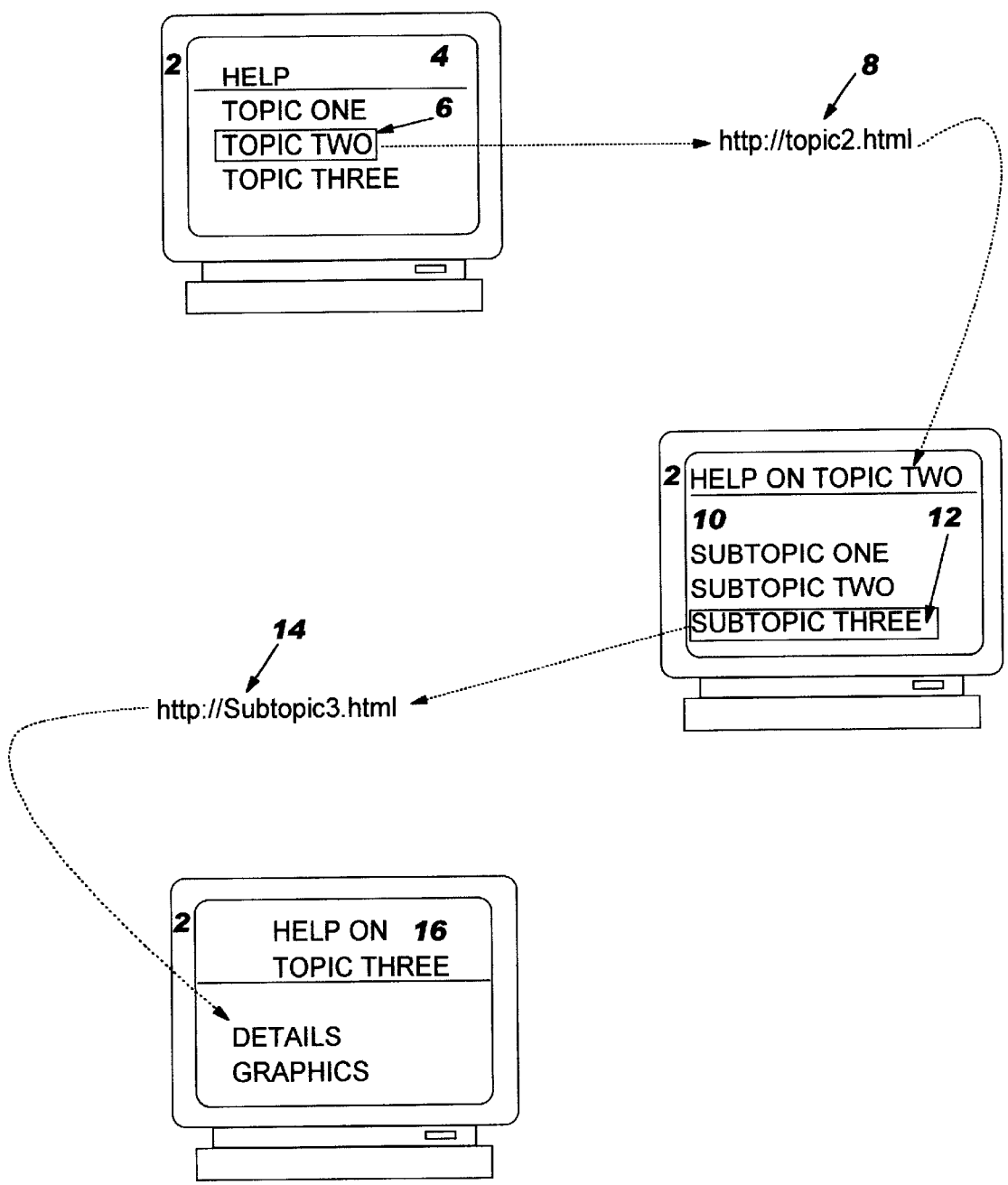
FIG. 1 is a schematic illustration of navigational linking a simple help system in a single directory.

FIG. 1 illustrates a simple series of nested links in online help documentation drawn from files locate in a single directory. The main help screen 4 listing help topics is rendered on a computer display 2. The main screen 4 includes a hypertext label 6 presented on the display 2 as Topic Two, which has been programmed in HTML as "<A HREF="topic2.html">Topic Two<!A>". The foregoing tag is a link to the address "topic2.html" 8, the file for a page 10 containing a more detailed help description for Topic Two. When the link is activated, the browser renders the page called Help on Topic Two 10 without having to pass linearly through any pages related to Topic One.

Similarly, the Help on Topic Two page 10 contains a hypertext link 12 to more detailed help on Subtopic Three. This link 12, programmed in HTML as "<A HREF="suptopic3.html">Subtopic Three</A>", links to the file called "subtopic3" 14 containing this detailed help. On activation of the link, the page called Help on Subtopic Three 16 is rendered.

Figure 2:
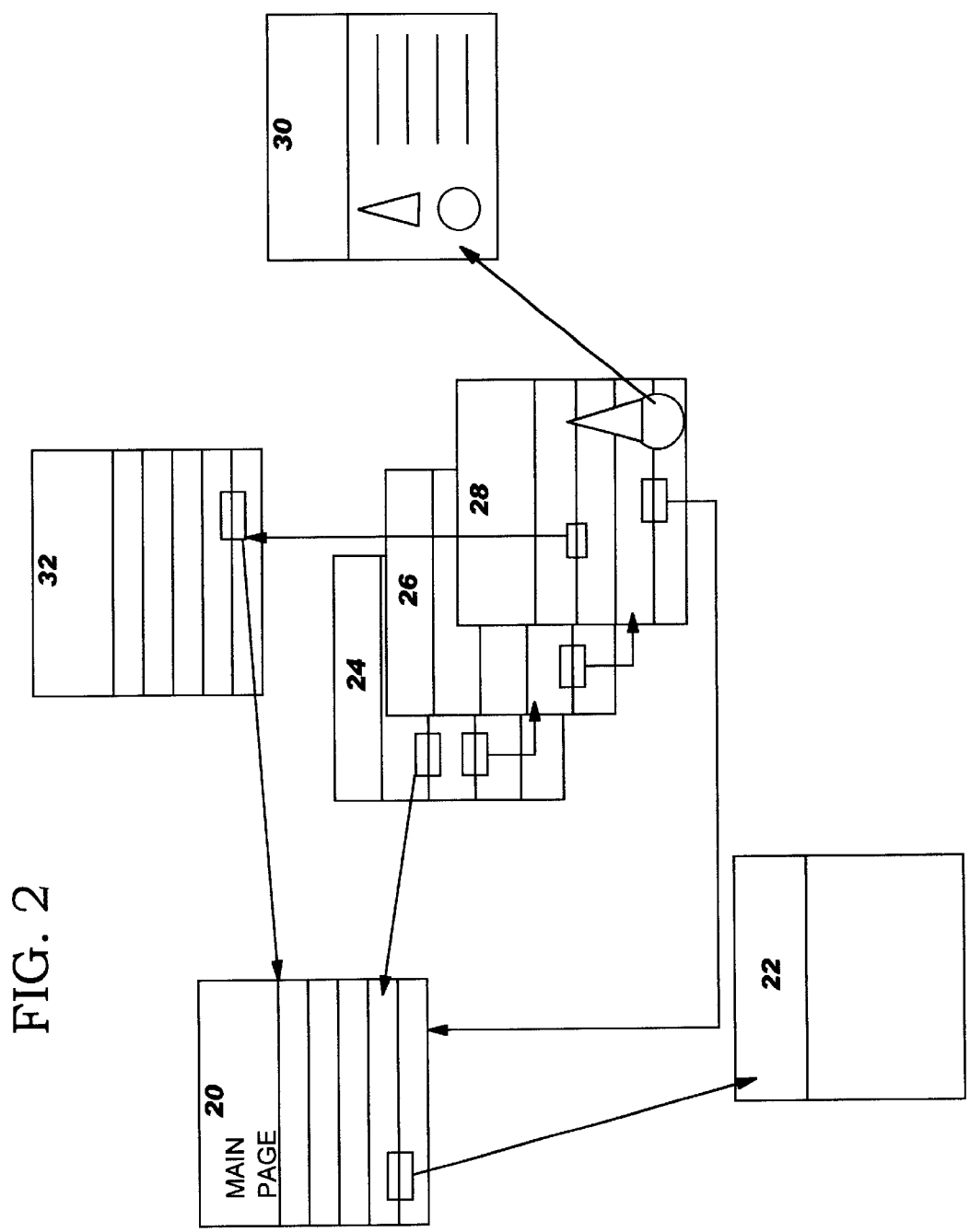
FIG. 2 is a view, similar to FIG. 1, illustrating a more complex online system interconnected with nonlinear navigational links.

A more complex case is illustrated in FIG. 2. These interconnected pages could be for an online use, such as a complex help system, an authoring/modeling tool or a system specification. It could also represent pages interconnected over the Internet. As can be seen, several of the pages are linked, but page 20 contains reference links to it from a number of the other pages 24, 28, 32.

Any of these reference links may be under labels located in mid-text in the referencing pages. The textual contexts could vary. If the name of page 20 were to be changed to a better descriptor, etc., conventionally, the writer would have to go back through the specification or documentation, and locate and change all reference labels to the new term/label.

As discussed above, in the present invention, the addition of a small amount of case information as data on a link can be used as a lexical transform in order to permit writer to propagate the change directly and automatically across the reference links.

In the case of hypertext, the address or URL can be extended to add a series of attributes that define the number and mood of the label article in order to work out the different endings for the main word and any of its adjectives in the label phrase. These could include:

| First position | Second position | Third position |
|---|---|---|
| number | case | article information |

Then, when the browser is rendering the text for a page containing a link, it resolves the link by requiring the destination object to give the default name for the label, but then applies a grammatical transformation to the name when rendering the label wording, as dictated by the attribute extension on the link defining the label context.

Figure 3:
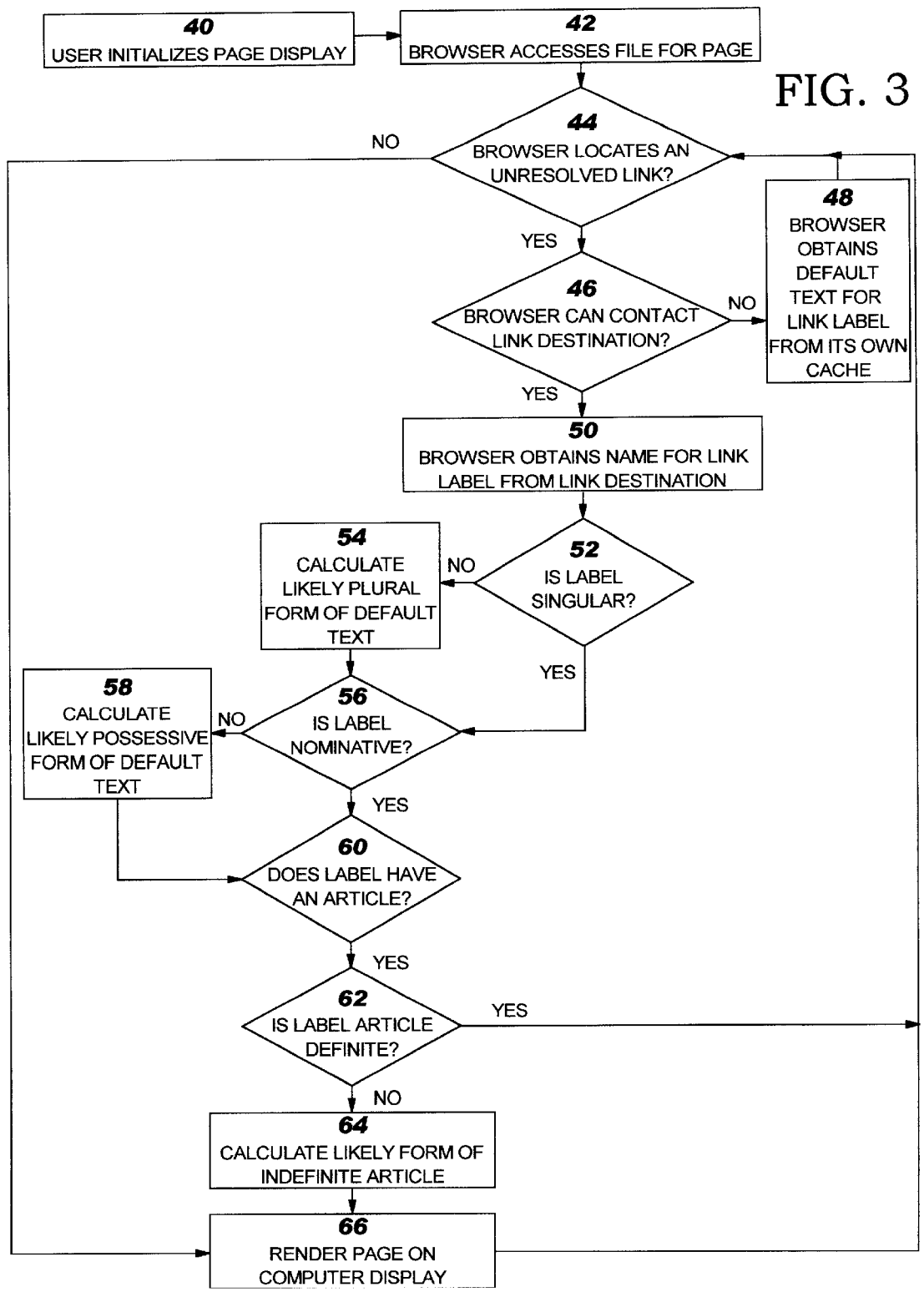
FIG. 3 is a flow diagram illustrating a method for executing the resolution of labels according to a preferred embodiment of the invention.

The flow diagram of FIG. 3 illustrates an embodiment for resolving lexical transformation questions with this extra data on the link.

When the user initializes a page containing links for display (block 40), the system browser accesses the file containing the page (block 42) and attempts to resolve all of the links contained in the page in order to obtain the appropriate name for each link label. The browser reads through the file, and as it locates an unresolved link (block 44), it tries to contact the link destination (block 46). If it is unsuccessful in doing so, the browser obtains default text from its own cache for rendering the link label (block 48).

If the browser is successful in obtaining the name of the destination page for the link to it (block 50), it will render text of the label in the manner programmed in the link tag. Where the link tag or data includes lexical information on the label, as described herein, the browser will determine whether:

1. the label is singular or plural (block 52). If the data indicates the label is plural, the browser calculates the likely plural form of the default text from the destination name using a standard algorithm (block 54).
2. the label is nominative or possessive (block 56). If the label is possessive, the browser calculates the likely possessive form of the label from the destination name based on the earlier calculation whether the label is singular or plural (block 58).
3. the label has an article (block 60), and if so, whether the article is definite or indefinite (block 62). If the label contains an indefinite article, the browser calculates the form of the article based on its earlier determination whether the label is singular or plural.

The foregoing transformations can be usefully calculated algorithmically for English phrases for at least 80% of the cases. The exceptions, where the transformation is unlikely to create a correct label, in context, are the relatively rare cases of irregular plurals. By using a slightly more sophisticated linguistic technology to perform the resolution of link names into labels, such as an online dictionary that is able to provide irregular word forms, completely correct labels can be derived for simple noun phrase. Using a more complex markup scheme, other lexical forms eg. verbs could also be used as labels.

The browser performs the same operation for every link in the page data (block 44). Once all of the links have been resolved the browser can render the page on the display (66).

The same linguistic markers and principle may also be used for any other natural language, such as French or German for which a translation engine is available. By taking the root of the noun phrase of a label, and using the stored data on number and mood, the correct case inflexion can be applied automatically in a large number of different languages; simple transforms could be used to work out all of the different endings for the article and adjectives in the noun phrase. Then when the noun is translated in the destination object, all references to the noun can be made to agree.

The preferred embodiment of the invention has been discussed in the context of systems in which all links are stored locally and the destination objects are already known. The invention can be extended to networked and Internet contexts, having remote destination objects, with modifications that would be obvious to those skilled in the art.

The embodiments of the invention in which an exclusive property or privilege is claimed are defined as follows:

1. A system for rendering text for a page to be displayed by computer, said page containing a navigational reference to another computer-displayable page, the system comprising:
   a link attribute on the navigational reference identifying lexical characteristics of text for the navigational reference in context of the text for the page to be displayed; and
   a text-rendering program calculating at least one likely form of the text for the navigational reference to another computer-displayable page from the link attribute that identifies the lexical characteristics of text for the navigational reference in context of the text for the page to be displayed, while rendering the text for the page to be displayed, so as to properly display the navigational reference in proper lexical context with the text of the page to be displayed.

2. A system for rendering text for a page to be displayed by computer, according to claim 1, wherein the text-rendering program comprises a browser.

3. A system for rendering text for a page to be displayed by computer, according to claim 2, wherein the browser has graphical and text rendering properties.

4. A system for rendering text for a page to be displayed by computer, according to claim 1, wherein the link attribute comprises data identifying number and mood of the text for the navigational reference in the context of the text for the page to be displayed, wherein the number of the text includes singular and plural and the mood of the text includes nominative and possessive.

5. A system for rendering text for a page to be displayed by computer, according to claim 1, wherein the link attribute comprises data identifying number and case of the text for the navigational reference in the context of the text for the page to be displayed, wherein the number of the text includes singular and plural and the case of the text includes upper case and lower case.

6. A system for rendering text for a page to be displayed by computer, according to claim 1, wherein the link attribute comprises data identifying properties of a grammatical article in the text for the navigational reference in the context of the text for the page to be displayed, wherein the grammatical article in the text includes a definite article and an indefinite article.

7. A system for rendering text for a page to be displayed by computer, according to claim 5, wherein the link attribute comprises data identifying properties of a grammatical article in the text for the navigational reference in the context of the text for the page to be displayed.

8. A system for rendering labels for navigational reference links to destination objects for display on a page of data on a computer, comprising:

programming data providing lexical properties associated with the labels in the context of the page of data;

a browser program for rendering text and graphics for the page of data, the browser program including (i) means to obtain name changes from the destination objects, and (ii) means to transform the name changes to contextual text using the programming data providing lexical properties associated with the labels in the context of the page of data, so as to properly render the labels for navigational reference links in proper lexical context with the text.

9. A system for rendering labels for navigational reference links to destination objects, according to claim 8, wherein the programming data identifies the number and mood of the labels in the context of the page of data and the means in the browser to transform the name changes to contextual text comprises routines to determine the likely endings for the name changes for rendering at text, wherein the number of the labels includes singular and plural and wherein the mood of the labels includes nominative and possessive.

10. A system for rendering labels for navigational reference links to destination objects, according to claim 8, wherein the programming data identifies the number and case of the labels in the context of the page of data and the means in the browser to transform the name changes to contextual text comprises routines to determine likely endings for the name changes for rendering as text, wherein the number of labels includes singular and plural and wherein the case of the labels includes upper case and lower case.

11. A system for rendering labels for navigational reference links to destination objects, according to claim 8 or 10, wherein the programming data identifies properties associated with grammatical articles in the labels in the context of the page of data and the means in the browser to transform the name changes to contextual text comprises routines to determine likely grammatical articles for rendering as text, wherein the grammatical articles include definite articles and indefinite articles.

12. A system for rendering labels for navigational reference links to destination objects, according to claim 10, wherein the programming data identifies properties associated with grammatical articles in the labels in the context of the page of data and the means in the browser to transform the name changes to contextual text comprises routines to determine likely grammatical articles for rendering as text.

13. A method for rendering a grammatically transformed label from a first navigational link residing in a first page of data on a computer, comprising the steps of:

identifying textual changes in a reference label from a second navigational link residing in a second page of data on a computer, the reference label having lexical data which provides lexical information in the context of the first page of data;

transforming the reference label based on the lexical data to provide the grammatically transformed label; and rendering the grammatically transformed label from the first navigational link residing in the first page of data.

14. The method of claim 13, wherein the lexical data defines a singular label and/or a plural label.

15. The method of claim 13, wherein the lexical defines a nominative label and/or a possessive label.

16. The method of claim 13, wherein the lexical data defines an upper case label and a lower case label.

17. The method of claim 13, wherein the lexical defines a definite article and/or an indefinite article.

18. A system for rendering a grammatically transformed label from a first navigational link residing in a first page of data on a computer, comprising:

means for identifying textual changes in a reference label from a second navigational link residing in a second page of data on a computer, the reference label having lexical data which provides lexical information in the context of the first page of data;

means for transforming the reference label based on the lexical to provide the grammatically transformed label; and means for rendering the grammatically transformed label from the first navigational link residing in the first page of data.

19. The system of claim 18, wherein the lexical data defines a singular label and/or a plural label.

20. The system of claim 18, wherein the lexical data defines a nominative label and/or a possessive label.

21. The system of claim 18, wherein the lexical defines an upper case label and a lower case label.

22. The system of claim 18, wherein the lexical data defines a definite article and/or an indefinite article.

23. A computer program product for rendering a grammatically transformed label from a first navigational link residing in a first page of data on a computer, the computer program product comprising a computer-readable storage medium having computer-readable program code embodied therein, the computer-readable program code comprising:

computer-readable program code that identifies textual changes in a reference label from a second navigational link residing in a second page of data on a computer, the reference label having lexical data associated therewith which provides lexical information in the context of the first page of data;

computer-readable program code that transforms the reference label based on the lexical data that identifies a number, a mood, a case and/or an article of the reference label in the context of the first page of data to provide the grammatically transformed label; and computer-readable program code that renders the grammatically transformed label from the first navigational link residing in the first page of data.

24. The computer program product of claim 23, wherein the lexical data defines a singular label and/or a plural label.

25. The computer program product of claim 23, wherein the lexical data defines a nominative label and/or a possessive label.

26. The computer program product of claim 23, wherein the lexical data defines an upper case label and a lower case label.

27. The computer program product of claim 23, wherein the lexical data defines a definite article and/or an indefinite article.

* * * * *